United States Patent
Kozlowski et al.

(10) Patent No.: US 8,246,475 B2
(45) Date of Patent: Aug. 21, 2012

(54) CONSTANT VELOCITY JOINT

(75) Inventors: Keith A. Kozlowski, Lynn Haven, FL (US); Brian J. Kleinfeld, Saginaw, MI (US); Matthew A. Berube, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 238 days.

(21) Appl. No.: 12/715,883

(22) Filed: Mar. 2, 2010

(65) Prior Publication Data

US 2011/0059803 A1 Mar. 10, 2011

Related U.S. Application Data

(60) Provisional application No. 61/156,742, filed on Mar. 2, 2009.

(51) Int. Cl.
*F16D 3/84* (2006.01)
(52) U.S. Cl. .......... 464/141; 464/175
(58) Field of Classification Search .......... 464/141, 464/173–175, 906; 277/636
See application file for complete search history.

(56) References Cited

U.S. PATENT DOCUMENTS

| | | | |
|---|---|---|---|
| 1,103,716 A | 7/1914 | Wallbillich | |
| 1,763,206 A | 6/1930 | Woveris | |
| 3,296,830 A | 1/1967 | Runkle | |
| 4,019,347 A | 4/1977 | Krude | |
| 4,224,808 A * | 9/1980 | Gehrke | 464/175 |
| 4,472,159 A | 9/1984 | Krude | |
| 4,556,400 A * | 12/1985 | Krude et al. | 277/636 X |
| 4,611,373 A | 9/1986 | Hazebrook | |
| 4,685,897 A | 8/1987 | Krude | |
| 4,753,626 A | 6/1988 | Hazebrook et al. | |
| 4,832,657 A | 5/1989 | Hahn | |
| 5,230,659 A | 7/1993 | Bird et al. | |
| RE34,341 E * | 8/1993 | Fukumura et al. | 464/175 |
| 5,267,905 A | 12/1993 | Wenzel et al. | |
| 6,264,568 B1 * | 7/2001 | Frazer et al. | 464/173 |
| 6,280,338 B1 | 8/2001 | Hayama et al. | |
| 6,537,045 B2 | 3/2003 | Riegger et al. | |

(Continued)

FOREIGN PATENT DOCUMENTS

| GB | 1 596 837 | * 9/1981 |
|---|---|---|
| WO | 8809445 A1 | 1/1988 |

OTHER PUBLICATIONS

E.R. Wagner, P.E.—Saginaw Steering Gear Div., GMC, "Double Offset Universal Joint" (End Motion Type), Section 3.2.13, pp. 167-170, 1979.

(Continued)

*Primary Examiner* — Gregory Binda
(74) *Attorney, Agent, or Firm* — Cantor Colburn LLP

(57) ABSTRACT

A boot assembly and constant velocity joint utilizing the boot assembly is provided. The constant velocity joint and boot assembly includes a first shaft, the first shaft having an axle portion extending between a first end and a second end, at least one of the first end and the second end having an enlarged joint portion. It also includes a hollow boot disposed on the first shaft having a joint end and a shaft end, the joint end disposed proximate the enlarged joint portion and the shaft end disposed proximate the axle portion. The constant velocity joint also includes a spacer, the spacer having an inner surface disposed on the axle portion and an outer surface having the shaft end of the boot disposed thereon.

18 Claims, 6 Drawing Sheets

U.S. PATENT DOCUMENTS

| | | | |
|---|---|---|---|
| 6,685,571 | B1 | 2/2004 | Smith |
| 6,910,970 | B2 | 6/2005 | Kobayashi |
| 7,624,819 | B1 | 12/2009 | LeBlanc et al. |
| 7,690,999 | B2 | 4/2010 | Nozaki et al. |
| 2005/0272510 | A1 | 12/2005 | Nakagawa et al. |
| 2007/0161428 | A1 | 7/2007 | Nakao et al. |
| 2009/0156319 | A1 | 6/2009 | Mondragon et al. |

OTHER PUBLICATIONS

E.R. Wagner, P.E., "Basic Requirements for Constant Velocity Universal Joints" Universal Joint and Driveshaft Design Manual, AE-7, Society of A Automotive Engineers, Inc., Warrendale, PA pp. 99-101, TJ1079, S62 1979.

* cited by examiner

CONSTANT VELOCITY JOINT

CROSS-REFERENCES TO RELATED APPLICATIONS

This patent application claims priority to U.S. Provisional Patent Application Ser. No. 61/156,742 filed Mar. 2, 2009, which is incorporated herein by reference in its entirety.

FIELD OF THE INVENTION

The subject invention generally relates to constant velocity (CV) joints, and more particularly, to CV joints that include sealing boot assemblies.

BACKGROUND

CV joints are typically employed in automotive axial drive shafts, and especially in front-wheel-drive vehicles between the transaxle differential and the driving wheel. The CV joints transmit a torque at various speeds, angles and telescopic positions between a first shaft and a second shaft.

Current developments in the field of CV joints are generally directed toward improving performance of these CV joints, such as by increasing their torque transmitting capability and reducing their noise and vibration. It is also necessary to provide sealing of the various joint configurations developed to ensure their performance and provide desirable protection in their operating environments.

It is desirable to seal the CV joints described above with a boot to prevent dirt and debris from entering and damaging the components of the CV joint. Such boots are often manufactured from thermoplastic materials for many reasons, including their cost and ability to provide the desired protection for the CV joints over their operating lifetimes. However, any boot utilized must permit passage of the larger diameter portions, such as their ends which comprise portions of the CV joint, therethrough, while also providing sealing against the smaller diameter of the axle portion of the associated shaft. The thermoplastic boots typically utilized, while sufficiently flexible for the intended use, are relatively inelastic, i.e., the thermoplastic boots typically utilized are not capable of expanding or stretching to permit passage of the larger diameter portions therethrough and also sealing against the smaller diameter axle portions. Therefore, it is desirable to provide CV joints having thermoplastic boots which are capable of providing the necessary joint protection, but which are also capable of providing design flexibility for installation over certain portions of the joints that have enlarged diameters, while also providing sealing on relatively smaller diameter portions, such the joint shafts.

SUMMARY OF THE INVENTION

In one exemplary embodiment of the present invention, a CV joint is provided. The CV joint includes a first shaft, the first shaft having an axle portion extending between a first end and a second end, at least one of the first end and the second end having an enlarged joint portion. It also includes a hollow boot disposed on the first shaft having a joint end and a shaft end, the joint end disposed proximate the enlarged joint portion and the shaft end disposed proximate the axle portion. The CV joint also includes a spacer, the spacer having an inner surface disposed on the axle portion and an outer surface having the shaft end of the boot disposed thereon.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
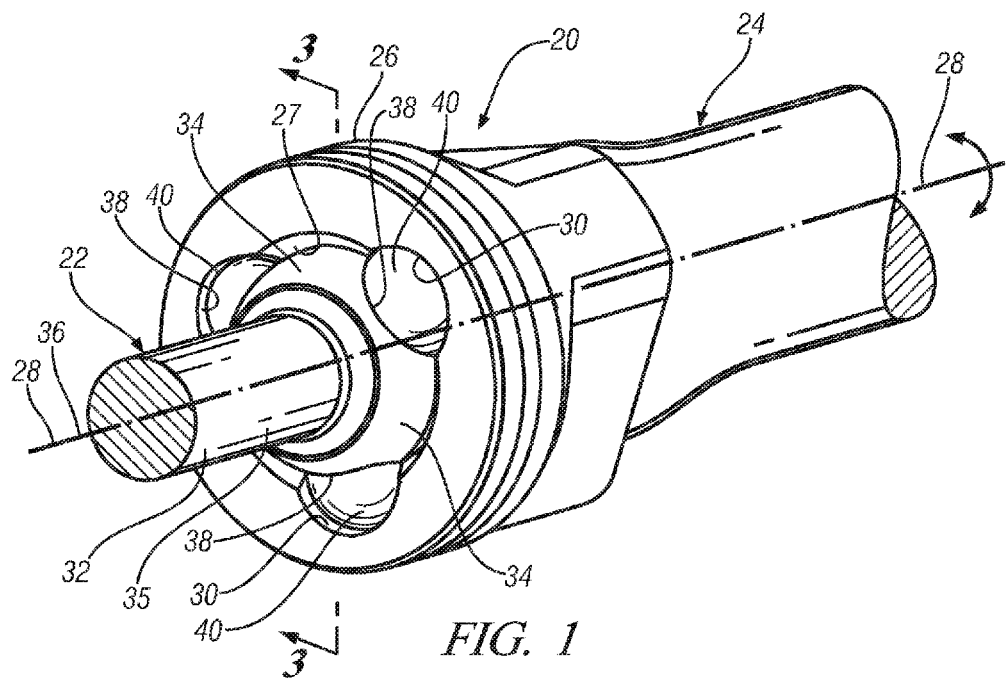
FIG. 1 is a perspective view of a CV joint as disclosed.

The following description is merely exemplary in nature and is not intended to limit the present disclosure, application or uses. It should be understood that throughout the drawings, corresponding reference numerals indicate like or corresponding parts and features.

There are various applications where it is desirable to use a thermoplastic boot to seal a CV joint and protect the joint from the external application environment. In some of these applications, the shaft on which the boot is to be sealingly secured includes an enlarged end portion employed in the joint, such as a pocket portion, proximate the end of the shaft over which the opening in the boot must be passed prior to securing the boot to the non-enlarged portion of the shaft, which has a smaller diameter than the enlarged end portion. In some of these applications, it is not possible to pass the boot over the narrow portion of the shaft during installation, and it is necessary to pass the boot over the enlarged end portion of the shaft. This is the case, for example, where the shaft is already secured in the application and does not have a narrow free end over which the boot may be passed, or where the shaft is enlarged at both ends, such as where the shaft has a CV joint pocket portion at each end. In the case of thermoplastic boots, the thermoplastic materials employed for such boots are generally not sufficiently elastic to elastically accommodate the differences in diameters of the enlarged end portions and non-enlarged portions and still provide sealing engagement with the non-enlarged portion of the shaft, thereby making it difficult to seal the shaft end of the boot against the shaft. A thermoplastic boot assembly for a shaft having an enlarged end, such as a shaft for a CV joint having a pocket portion on one or both ends, that enables sealing engagement of the shaft end of the boot to the non-enlarged portion of the shaft through the employment of a circumferential spacer that is configured to sealingly engage the shaft end of the boot and the non-enlarged portion of the shaft is disclosed herein. The boot assembly provides a sealed CV joint that includes the boot assembly, and may also provide a shaft that includes a sealed CV joint and boot assembly at each end. A boot assembly that includes the spacer may also be configured to provide positive indexing of the location of the shaft end of the boot on the shaft, a feature or features to securely and sealingly engage the shaft end of the boot, and a stop shoulder to index the position of the shaft end of the boot on the spacer, as disclosed herein.

Referring to the Figures, a CV joint is shown generally at 20. The CV joint 20 (FIG. 3) is configured to transmit torque between a first end 35 of first shaft 22 and a second shaft 24 at various rotational speeds, joint angles ($\alpha$) and telescopic axial positions. In an exemplary embodiment, a second CV joint 20' (FIG. 4) may also be coupled to a second end 35' of first shaft 22 and configured to transmit torque between first shaft 22 and a third shaft 24' at various speeds, angles and telescopic positions. The use of a first shaft 22 that is configured for use with CV joint 20, and may also be configured for use with second CV joint 20', may be used in any suitable application requiring transmission of torque along a series of shafts, and is particularly suited for use in automotive axial drive shafts, and is especially useful in the drivetrain of front-wheel-drive vehicles between the transaxle differential and the driving wheels. However, it should be appreciated that the CV joint 20, or a shaft 24 that includes CV joint 20 and CV joint 20', may be utilized in other situations in which a torque must be transmitted between shafts that articulate, i.e., move relative to each other, particularly those where the shafts may be angulated or telescoped, or both, relative to one another.

Figure 2:
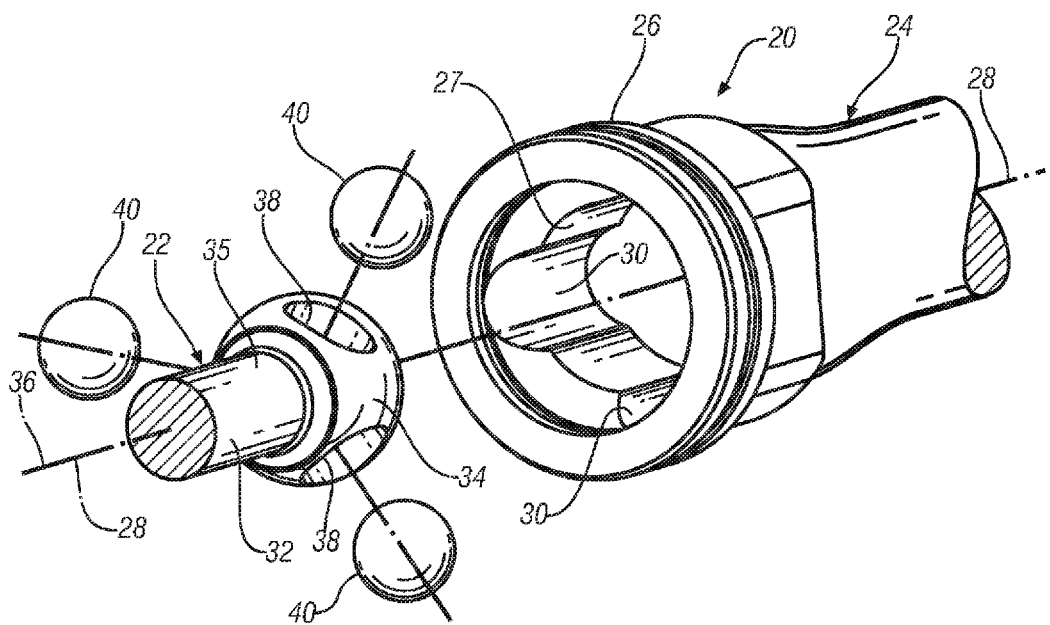
FIG. 2 is a disassembled perspective view of the CV joint of FIG. 1.
Figure 3:
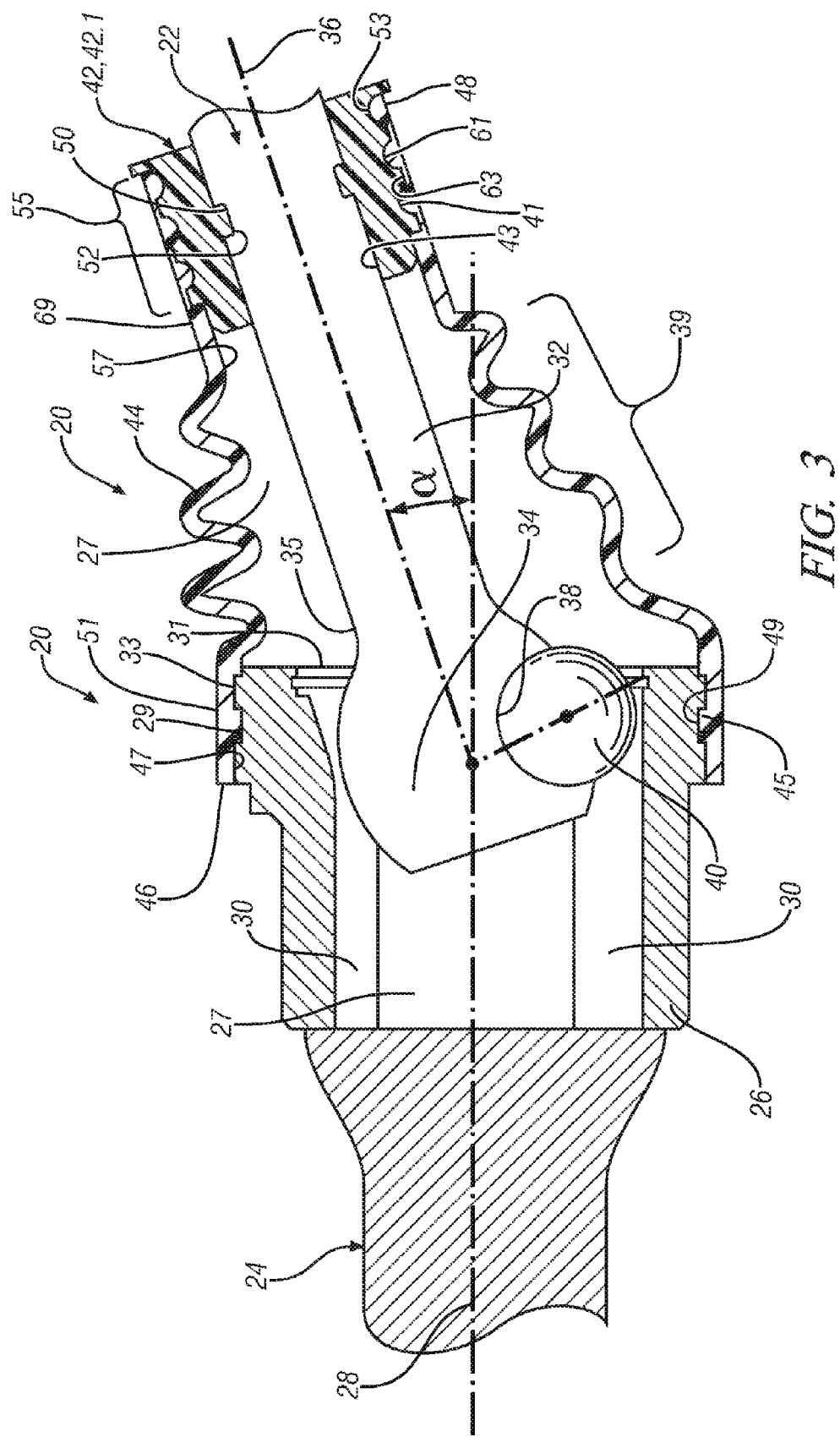
FIG. 3 is a partial cross sectional view of the CV joint of FIG. 1.

As illustrated in FIGS. 1-3, the second shaft 24 includes a joint housing 26 disposed at one end of the second shaft 24. Second shaft 24 may be of any suitable shaft configuration, including solid, hollow and partially hollow shaft configurations. The second shaft 24 is rotatable about a second longitudinal axis 28. The joint housing 26 includes a plurality of radially and circumferentially spaced grooves 30 disposed within an inner bore 27 of the joint housing 26. The grooves 30 extend along the second longitudinal axis 28. As shown, the joint housing 26 defines three grooves 30 radially and circumferentially spaced about the second longitudinal axis 28 both radially and circumferentially equidistant from each other (i.e., spaced 120 degrees apart from each other about the second longitudinal axis 28). However, it should be appreciated that the joint housing 26 may define some other number of grooves 30, such as 4, 6, 8 or more grooves 30, if design considerations so require.

Figure 4:
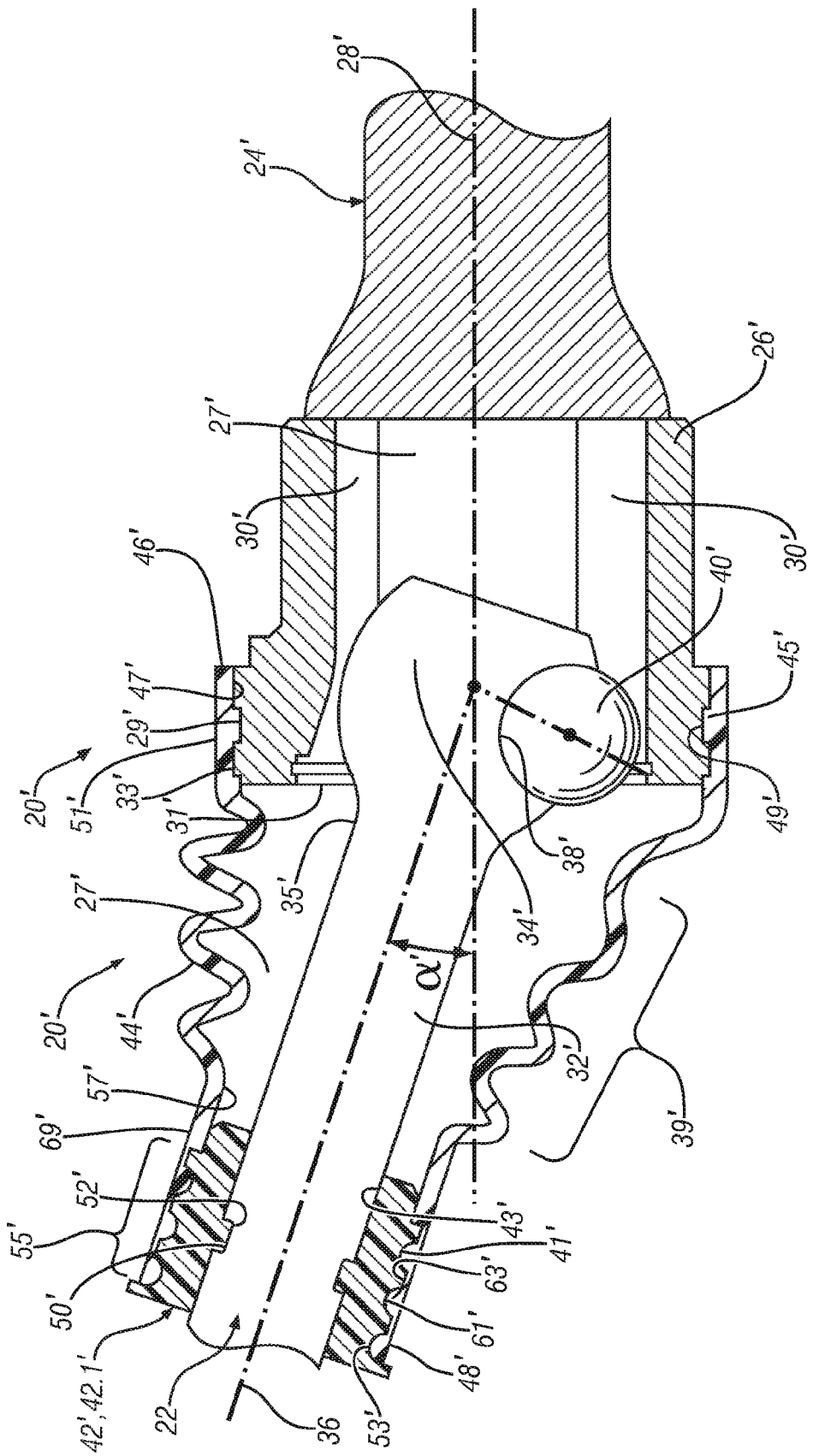
FIG. 4 is a partial cross sectional view of an exemplary embodiment of a second CV joint on a second end of the shaft of FIG. 1 as disclosed.

As illustrated in FIG. 4, a third shaft 24' may include a joint housing 26' disposed at one end of the third shaft 24'. Third shaft 24' may be of any suitable shaft configuration, including solid, hollow and partially hollow shaft configurations. The third shaft 24' is rotatable about a third longitudinal axis 28'. The joint housing 26' includes a plurality of radially and circumferentially spaced grooves 30' disposed within an inner bore 27' of the joint housing 26'. The grooves 30' extend along the third longitudinal axis 28'. As shown, the joint housing 26' defines three grooves 30' radially and circumferentially spaced about the third longitudinal axis 28' both radially and circumferentially equidistant from each other (i.e., spaced 120 degrees apart from each other about the third longitudinal axis 28'). However, it should be appreciated that the joint housing 26' may define some other number of grooves 30', such as such as 4, 6, 8 or more grooves 30', if design considerations so require. It will also be appreciated that first CV joint 20 and second CV joint 20' may have the same size and joint configuration or a different size and joint configuration.

The first shaft 22 includes an axle portion 32 and an enlarged joint end portion 34, such as a first pocket end 34 in the exemplary embodiment of FIGS. 1-3. In an exemplary embodiment, the first shaft 22 may also include an enlarged second pocket end 34' (FIG. 4). First shaft 22 may be of any suitable shaft configuration, including solid, hollow (not shown) and partially hollow (not shown) shaft configurations. The first pocket end 34 is disposed proximate a first end 35 of the axle portion 32, within the first joint housing 26 of the second shaft 24. The first pocket end 34 is moveable relative to the second shaft 24, this includes telescoping or axial movement and angular movement through joint angle ($\alpha$). The first shaft 22 is rotatable about a first longitudinal axis 36. The first pocket end 34 defines a plurality of first pockets 38 radially and circumferentially disposed about the first longitudinal axis 36 in complementary orientation relative to the plurality of first grooves 30. As such, the number of first pockets 38 is equal to the number of first grooves 30. As shown, the number of first pockets 38 is equal to three, with the three first pockets 38 radially and circumferentially spaced about the first longitudinal axis 36 equidistant from each other, i.e., the three first pockets 38 are radially spaced 120 degrees apart from each other about the first longitudinal axis 36. It should be appreciated that the number of first pockets 38 may differ than that shown and described herein, but is equal to the number of first grooves 30 defined by the first joint housing 26.

In one exemplary embodiment, FIG. 4, the second pocket end 34' is similar to the first pocket end 34' and is disposed proximate a second end 35' of the axle portion 32, within the second joint housing 26' of the third shaft 24'. The second pocket end 34' is moveable relative to the third shaft 24'. The first shaft 22 is rotatable about a first longitudinal axis 36. The second pocket end 34' defines a plurality of second pockets 38' radially and circumferentially disposed about the first longitudinal axis 36 in complementary orientation relative to the plurality of second grooves 30' of second joint housing 26'. As such, the number of second pockets 38' is equal to the number of second grooves 30'. As shown, the number of second pockets 38' is equal to three, with the three second pockets 38' radially and circumferentially spaced about the first longitudinal axis 36 equidistant from each other, i.e., the three pockets 38' are radially and circumferentially spaced 120 degrees apart from each other about the first longitudinal axis 36. It should be appreciated that the number of second pockets 38' may differ than that shown and described herein, but is equal to the number of second grooves 30' defined by the second joint housing 26'.

The CV joint 20 includes a plurality of drive balls 40, with one of the drive balls 40 rotatably disposed within each of the pockets 38 and also disposed within one of the grooves 30. In other words, each of the drive balls 40 is partially disposed within one of the pockets 38 and partially disposed within one of the grooves 30 opposing the pocket 38. Drive balls 40 may have any suitable configuration. In an exemplary embodiment, drive balls 40 may be spherical. The drive balls 40 are configured to transmit torque between the second shaft 24 and the first shaft 22 as they move within joint housing 28. This includes rotational movement as the second shaft 24 is rotated about the second longitudinal axis 28 and first shaft 22 is rotated about first longitudinal axis 36. It also includes movement associated with articulation of first shaft 22, second shaft 24 and CV joint 20. As first shaft 22 and second shaft 24 are angulated relative to one another the drive balls 40 are configured to roll along the grooves 30 and rotate within the pockets 38. It also includes telescoping axial movement associated with axial translation of first shaft 22 relative to second shaft 24. As first shaft 22 moves axially relative to second shaft 24, the drive balls 40 are configured to roll along the grooves 30 and rotate within the pockets 38. Joint 20 is configured to provide any of these movements individually or simultaneously, including simultaneous rotational, angular and axial movement.

The first pocket end 34 of the first shaft 22 is radially enlarged relative to the axle portion 32 of the first shaft 22 and may be configured to radially accommodate the pockets 38. Accordingly, the first pocket end 34 of the first shaft 22 includes a diameter transverse to the first longitudinal axis 36 that is greater than a diameter of the axle portion 32 of the first shaft 22 transverse to the first longitudinal axis 36. In other words, the first pocket end 34 of the first shaft 22 is larger than the axle portion 32 of the first shaft 22. In an exemplary embodiment, first pocket end 34 may be partially spherical.

Similarly, as illustrated in FIG. 4, the second pocket end 34' of the first shaft 22 is radially enlarged relative to the axle portion 32 of the first shaft 22 and may be configured to radially accommodate the second pockets 38'. Accordingly, the second pocket end 34' of the first shaft 22 includes a diameter transverse to the first longitudinal axis 36 that is greater than a diameter of the axle portion 32 of the first shaft 22 transverse to the first longitudinal axis 36. In other words, the second pocket end 34' of the first shaft 22 is larger than the axle portion 32 of the first shaft 22. In an exemplary embodiment, second pocket end 34' may be partially spherical.

As illustrated in FIGS. 1-3 and 5, a spacer 42 is coupled to the axle portion 32 of the first shaft 22, and axially spaced from the first pocket end 34 along the first longitudinal axis 36. The spacer 42 is disposed about the axle portion 32 of the first shaft 22. In an exemplary embodiment, the spacer 42 is disposed annularly about the axle portion 32 of the first shaft 22. Spacer 42 may have any suitable axial length and configuration for disposition about axle portion 32 of the first shaft 22. Where axle portion 32 is cylindrical, spacer 42 may also have a cylindrical configuration, but other configurations of the inner surface and outer surface of spacer 42 are possible in order to adapt spacer 42 to axle portion 32 and boot 44, and preferably for sealing engagement with axle portion 32 and boot 44. In an exemplary embodiment, spacer 42 is substantially cylindrical and includes an outer diameter transverse to the first longitudinal axis 36 that is substantially equal to the diameter of the first pocket end 34.

As illustrated in FIG. 3, a flexible, hollow boot 44 includes an open joint end 46 coupled to the joint housing 26 and an open shaft end 48 coupled to the spacer 42 and first shaft 22. Boot 44 may have any suitable boot profile along first longitudinal axis 36, including a tapered profile that narrows toward shaft end 48, such as a conical profile. Boot 44 may include an axially extending bellows portion 39 to provide additional flexibility, particularly for angular and telescoping movement as described herein. The boot 44 is configured to seal the inner bore 27 of the joint housing 26, including the drive balls 40, the grooves 30 and the pockets 38 from an external environment that may include dirt, debris and other materials that may be detrimental to the performance of joint 20. Boot 44 may also be used to seal in a lubricant (not shown) or lubricants, or other materials used to enhance the performance of joint 20. The boot 44 may be manufactured from any suitable material that is able to provide flexibility for movement of joint 20 while also sealing joint 20 from an external environment, such as an environment experienced by CV joints used for vehicular drivelines. In an exemplary embodiment, boot 44 may comprise a thermoplastic material, including a thermoplastic elastomer, such as polyester elastomer (e.g., Hytrel® manufactured by DuPont) or a polyester-polyether copolymer. The shape of the opening 47 in open joint end 46 is configured for coupling proximate open end 31 of joint housing 26 to outer surface 33. Joint end 46 may have any suitable shape (e.g., square, annular, etc.) and will preferably be the same as the shape of outer surface 33. In an exemplary embodiment, outer surface 33 is annular and the opening 47 in joint end 46 is also annular. Boot 44 may include a retention feature 45 on joint end 46, such as an inwardly protruding ring 49 that is configured for disposition in and engagement with recessed channel 29 proximate the open end 31 of housing 26, in order to couple and retain boot 44 on the outer surface 33 of housing 26. Retention feature 45 may also provide sealing engagement of boot 44 on outer surface 33 of housing 28. Additional retention mechanisms,), such as clamps (not shown) or sealing bands (not shown), may also be applied over the outer surface 51 of boot end 46 to further retain or provide sealing engagement of joint end 46 of boot 44 to the outer surface 33 of housing 28 proximate open end 31.

The shape of the opening 53 in open shaft end 48 is configured for coupling and sealing engagement to outer surface 41 of spacer 42 and inner surface 43 is configured for coupling and sealing engagement of inner surface 43 of spacer 42 to axle portion 32 of first shaft 22. Opening 53 of shaft end 48 may have any suitable shape (e.g., square, annular, etc.) and will preferably be the same as the shape of outer surface 41. In an exemplary embodiment, outer surface 41 is annular and the opening 53 in shaft end 48 is also annular. Inner surface 43 comprises a bore 37, FIG. 6, through spacer 42. Opening 53 of shaft end 48 may have any suitable shape (e.g., square, annular, etc.) and will preferably be the same as the shape of outer surface 41 of spacer 42. Boot 44 may include a retention feature 55, or plurality of retention features 55, on inner boot surface 57 proximate shaft end 48, such as an inwardly extending protrusion 61, or outwardly extending recess 63, or a combination thereof. Outer surface 41 of spacer 42 may also include a retention feature 59, or a plurality of retention features 59, such as outwardly extending protrusions 65 or inwardly extending recesses 67. Retention features 55 of boot 44 and retention features 59 of spacer 42 are configured for mechanical coupling and retention of shaft end 48 of boot 44 to outer surface 41 of spacer 42. For example, in an exemplary embodiment, inwardly extending protrusion 61, or outwardly extending recess 63, or both, are configured for mating engagement, respectively, with outwardly extending protrusions 65 or inwardly extending recesses 67, or both. Retention features 55 and retention features 59 may also provide sealing engagement of shaft end 48 of boot 44 on outer surface 41 of spacer 42. Additional retention mechanisms (not shown), such as clamps (not shown) or sealing bands (not shown), may also be applied over the outer surface 69 of shaft end 48 to further retain or provide sealing engagement of shaft end 48 of boot 44 to the outer surface 41 of spacer 42.

In an exemplary embodiment, the opening 53 in shaft end 48 of the boot 44 defines an annular opening having a diameter substantially equal to the outer diameter of the spacer 42 and the first pocket end 34 of first shaft 22. As such, the first pocket end 34 of the first shaft 22 may easily pass through the shaft end 48 of the boot 44, without requiring the boot 44 to plastically deform to accommodate the first pocket end 34. The outer diameter of the spacer 42, being substantially equal in size to the diameter of the shaft end 48 of the boot 44, is therefore appropriately sized to mate with and couple to the boot 44 in sealing engagement therewith. In one embodiment, the shaft end 48 of the boot 44 defines an annular opening having a diameter slightly less than the outer diameter of the spacer 42 and substantially equal to the first pocket end 34 in order to enable free passage of the pocket end therethrough but allowing slight elastic deformation the shaft end 48 of boot 44 as it is inserted over outer surface 41 of spacer 42 such that the elastic deformation causes the shaft end 48 of boot 44 to provides a small compressive sealing force against the outer surface 41 of spacer 42. Accordingly, the spacer 42 effectively increases the diameter of the axle portion 32 of the first shaft 22 so that the second end 48 of the boot 44 may mate with and seal against the spacer 42, thereby allowing the axle portion 32 to maintain the smaller diameter to reduce the weight of the CV joint 20 and first shaft 22.

Figure 5:
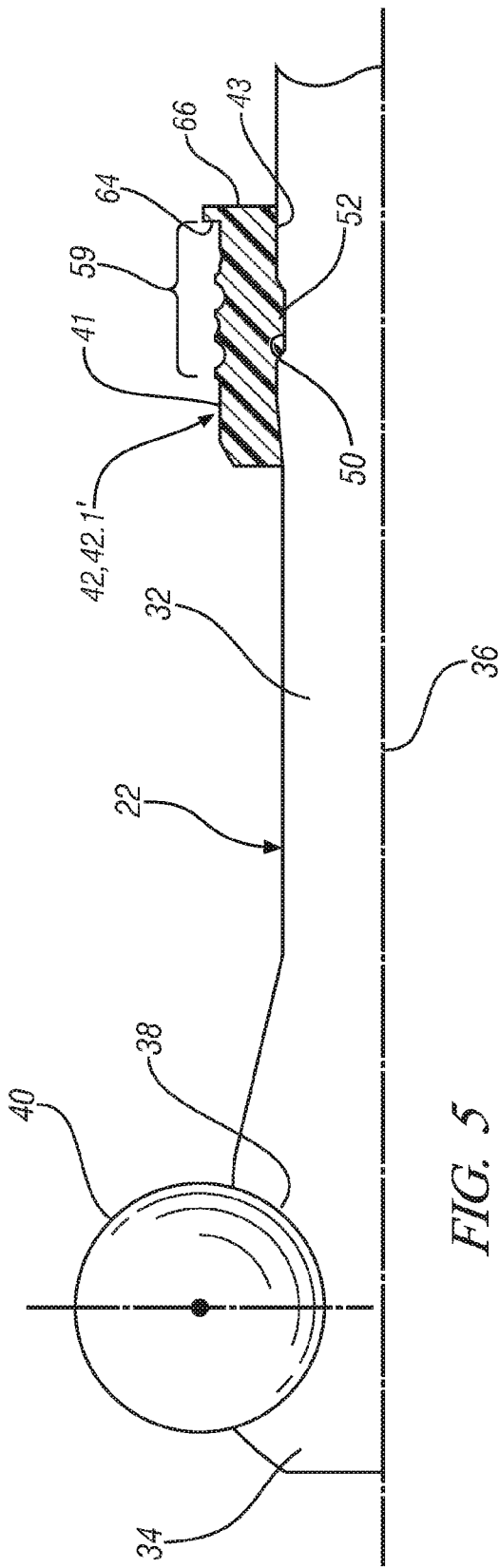
FIG. 5 is an enlarged partial cross sectional view of an exemplary embodiment of a first shaft having an enlarged joint end and axle portion, a ball and a spacer disposed thereon.
Figure 6:
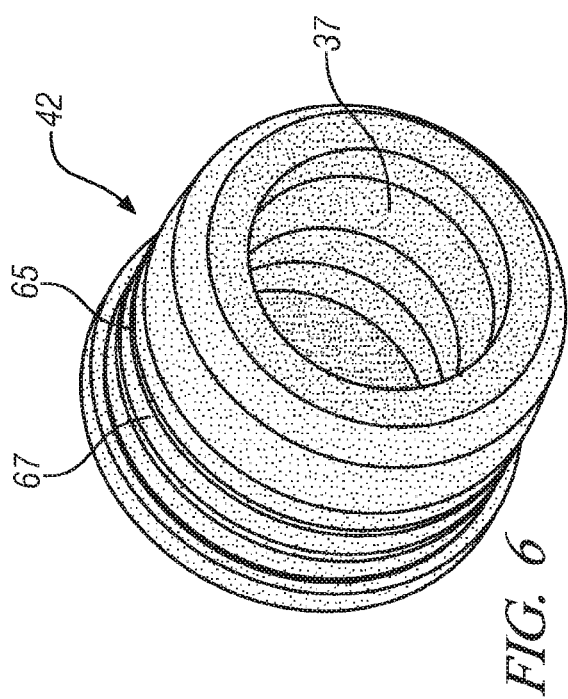
FIG. 6 is a perspective view of an exemplary embodiment of a spacer as disclosed herein.
Figure 7:
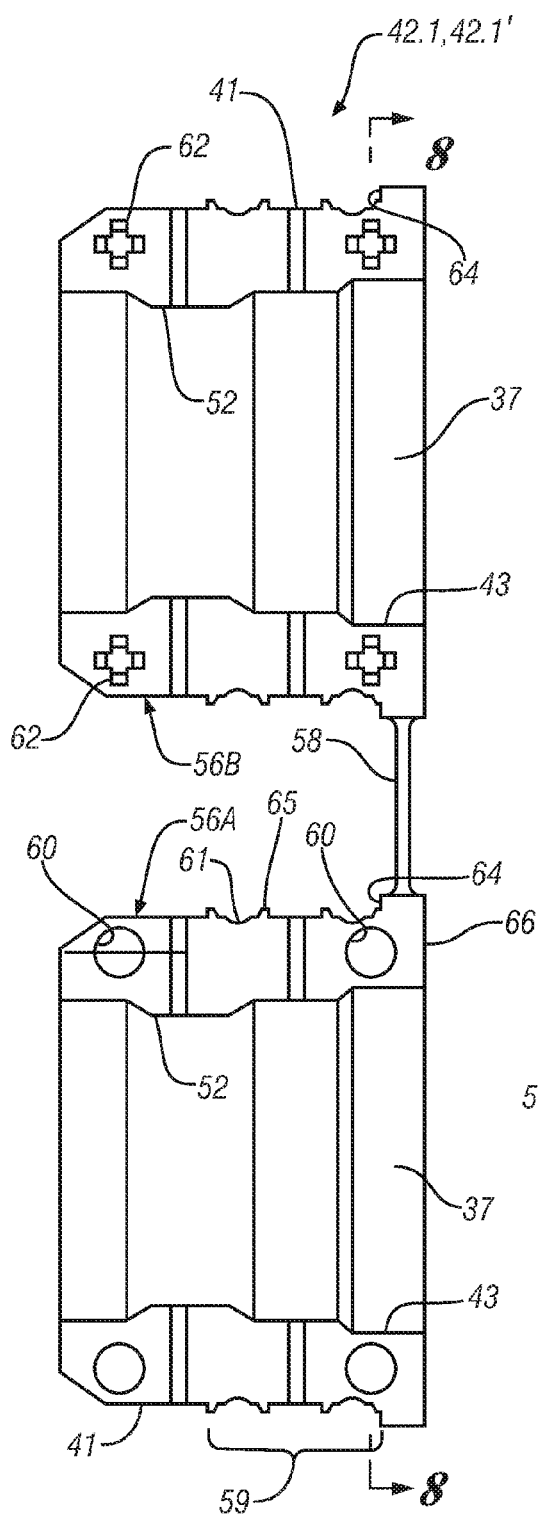
FIG. 7 is a front plan view of a second exemplary embodiment of a spacer in an unassembled state.
Figure 8:
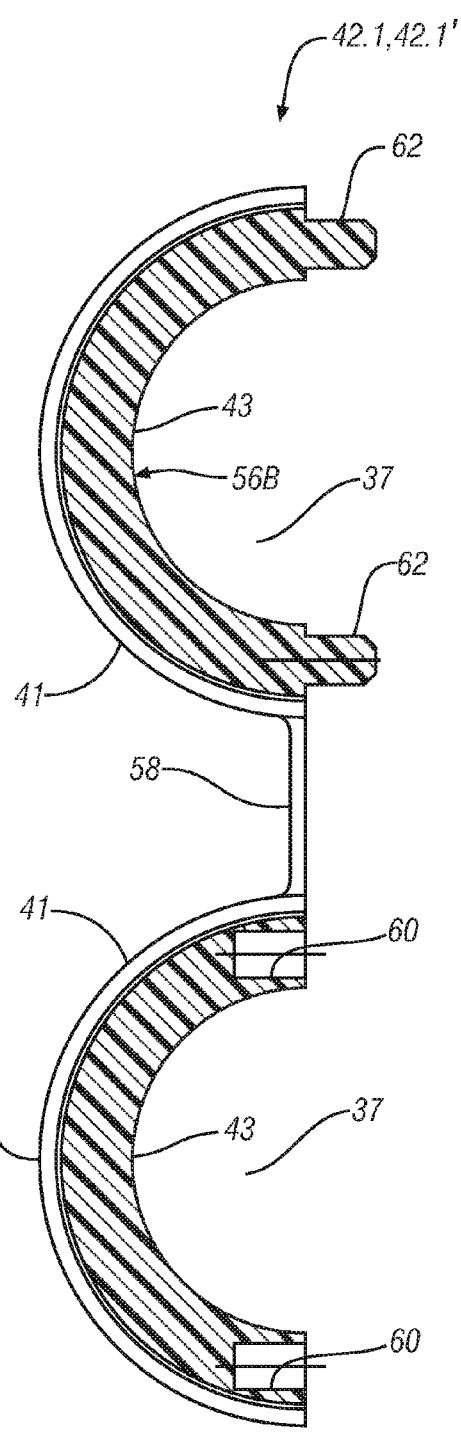
FIG. 8 is a cross-sectional view of the spacer of FIG. 7 taken along section 8-8.
Figure 9:
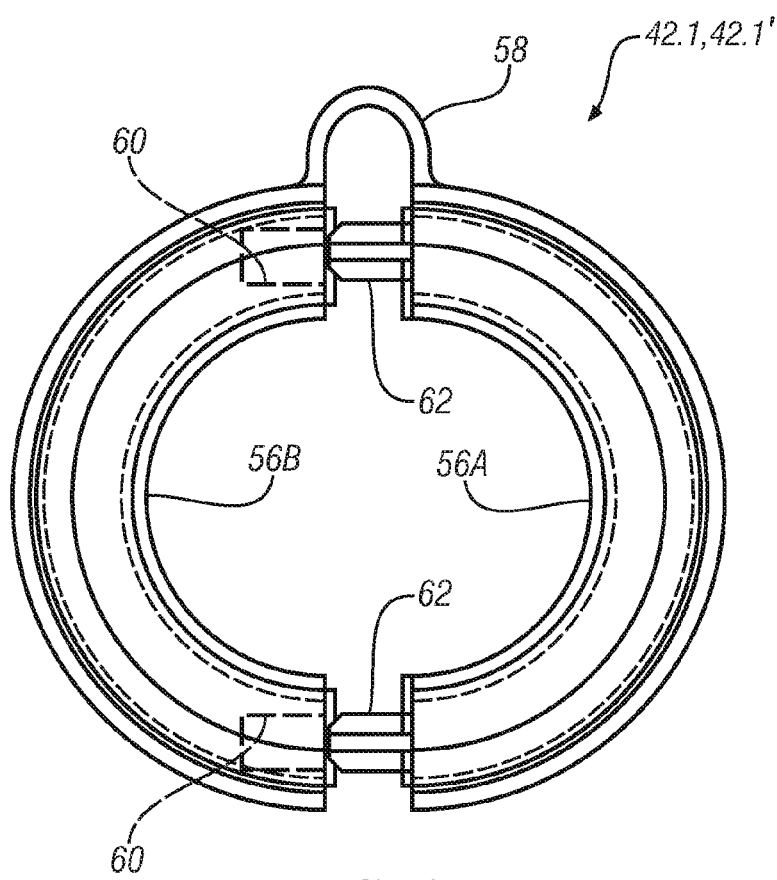
FIG. 9 is a top plan view of the spacer of FIG. 7 in a partially assembled state.
Figure 10:
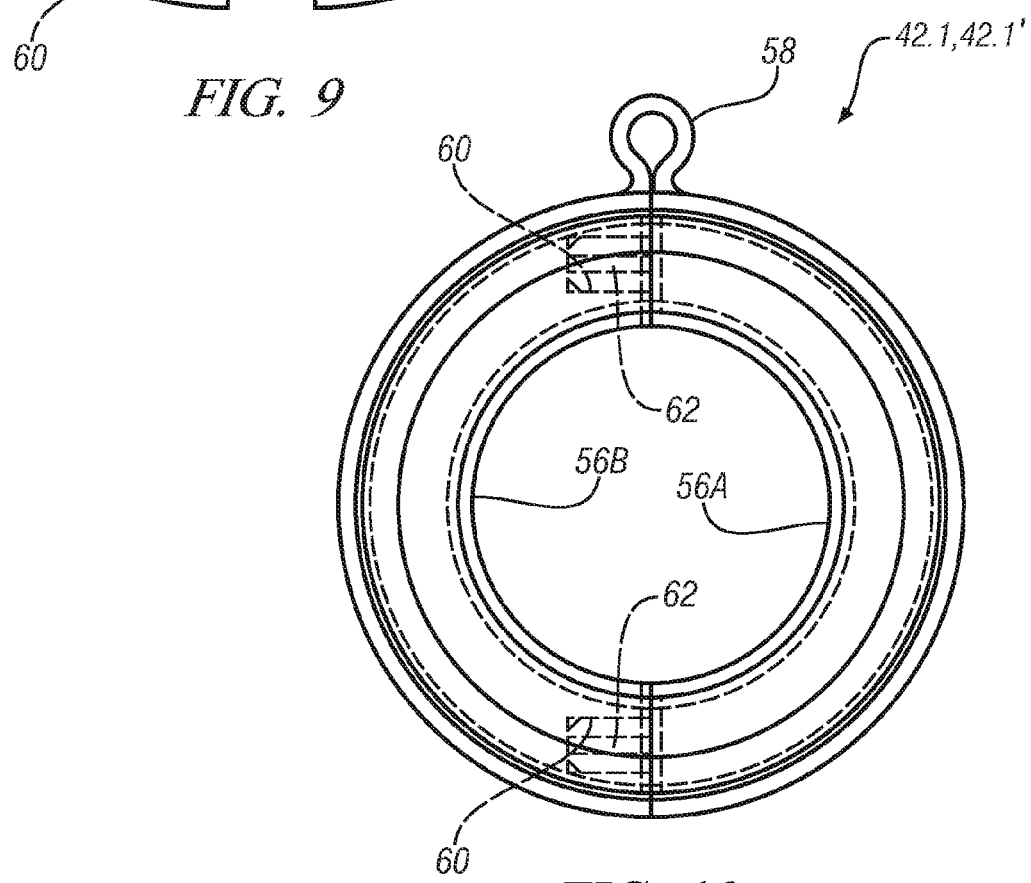
FIG. 10 is a top plan view of the spacer of FIG. 7 in an assembled state.

As shown in FIGS. 3, 5 and 6, in one embodiment the axle portion 32 of the first shaft 22 includes annular channel 50, and the spacer 42 includes a mating inward protrusion, such as inwardly protruding annular ring 52, disposed on inner surface 43 of bore 37 of the spacer 42. The annular ring 52 acts as a key and interlocks with the annular channel 50, which acts as a keyway, to secure and index the axial position of the spacer 42 on the first shaft 22. It should be appreciated that the spacer 42 and the first shaft 22 may include other mechanisms (not shown) for interlocking and indexing a portion of the spacer 42 to a portion of the first shaft 22. The diameters of inner surface 43 or annular ring 52, or both of them may be selected to be slightly smaller than the diameters of axle portion 32 or annular channel 50, respectively, so to create an interference fit between them and application of a sealing force of spacer 42 against axle portion 32.

The spacer 42 is preferably manufactured from and comprises a plastic material. In an exemplary embodiment, spacer may also comprise a thermoplastic material, including a thermoplastic elastomer, such as polyester elastomer (e.g., Hytrel® manufactured by DuPont) or a polyester-polyether copolymer. However, it should be appreciated that the spacer 42 may also be manufactured from other materials, such as, but not limited to, ceramic or metallic materials.

Referring to FIGS. 6-10, the spacer 42 is shown as an injection molded piece. As illustrated in FIG. 6, spacer 42 may be molded as an integral, one-piece component and axle portion 32, FIG. 5, is inserted through bore 37 to install spacer 42 on first shaft 22. As may be understood, the integral spacer 42 requires a first shaft 22 design that provides access to axle portion 32, i.e., that one of the ends may be passed through bore 37. The spacer 42 may be formed in a standard injection molding process and then inserted onto and attached to the first shaft 22.

Alternatively, an integral spacer 42 may be formed in place onto the first shaft 22 using conventional insert molding or other methods of forming an integral spacer 42 on axle portion of first shaft 22.

As shown in FIGS. 7-10, the spacer 42.1 may include two semi-cylindrical portions 56A, 56B coupled together along one edge by a thin strip of material 58. The strip of material 58 forms a hinge, about which the semi-cylindrical portions 56A, 56B may be bent around the first shaft 22, FIG. 5. One of the semi-cylindrical portions 56A includes at least one recess 60, and the other of the semi-cylindrical portions 56B includes at least one protrusion or detent 62 that is configured to be matingly inserted into and engage recess 60. As illustrated, a plurality of protrusions 62 may be configured for insertion and mating engagement with a corresponding plurality of recesses 60. As the semi-cylindrical portions 56A, 56B are wrapped around the first shaft 22, the detents 62 are inserted into the recesses 60 and form a plurality of snap fit connections, thereby attaching the semi-cylindrical portions 56A, 56B together to form the spacer 42.1. Spacer 42.1, comprising two semi-cylindrical portions 56A, 56B coupled together along one edge by a thin strip of material 58, may also be formed by injection molding or other suitable molding methods.

Spacer 42.1 may also be formed to include an outwardly extending stop shoulder 64 on an end 66 away from shaft end 48 of boot 44. Stop shoulder 64 may be used to index the insertion of shaft end 48 onto spacer 42.1 and provide a positive stop with shaft end 48 in abutting contact against stop shoulder 64.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A constant velocity joint, comprising:
    a first shaft, the first shaft having an axle portion extending between a first end and a second end, at least one of the first end and the second end having an enlarged joint portion, the enlarged joint portion comprising a pocket end having a plurality of circumferentially and radially spaced pockets formed therein;
    a hollow boot disposed on the first shaft having a joint end and a shaft end, the joint end disposed proximate the enlarged joint portion and the shaft end disposed proximate the axle portion, the boot also having a shaft end opening, wherein the enlarged joint portion and pocket end are configured for translation through the shaft end opening without plastic deformation of the shaft end; and
    a spacer having an inner surface disposed on the axle portion and an outer surface having the shaft end of the boot disposed thereon.

2. The constant velocity joint of claim 1, wherein the boot comprises a bellows portion extending between the joint end and shaft end.

3. The constant velocity joint of claim 1, wherein the spacer comprises a raised lip protruding inwardly from the inner surface configured for disposition in a recessed channel that extends around the periphery of the axle portion of the first shaft.

4. The constant velocity joint of claim 1, wherein the outer surface of the spacer comprises a least one peripherally extending protrusion or recessed channel, the inner surface of the boot comprises at least one peripherally extending protrusion or recessed channel, and the peripherally extending protrusion or recessed channel of the outer surface of the spacer is matingly disposed in the peripherally extending recessed channel or protrusion, respectively, of the inner surface of the boot.

5. The constant velocity joint of claim 1, wherein the boot comprises a thermoplastic material.

6. The constant velocity joint of claim 1, wherein the spacer comprises a thermoplastic material.

7. The constant velocity joint of claim 1, wherein one of the boot or the spacer comprises polyester or a polyester-polyether copolymer.

8. The constant velocity joint of claim 1, wherein the axle portion is cylindrical.

9. The constant velocity joint of claim 8, wherein the inner surface of the spacer comprises a cylindrical bore that is sealingly engaged on the cylindrical axle portion.

10. The constant velocity joint of claim 1, wherein the outer surface of the spacer is cylindrical.

11. The constant velocity joint of claim 10, wherein the inner surface of the boot comprises a cylinder that is sealingly disposed on the cylindrical outer surface of the spacer.

12. The constant velocity joint of claim 1, wherein the inner surface of the spacer comprises a cylindrical bore that is sealingly engaged on the axle portion, the outer surface of the spacer is cylindrical, the spacer comprises a first semi-cylindrical portion having a first mounting face and a second semi-cylindrical portion having a second mounting face, the first mounting face matingly adjoining the second mounting face.

13. The constant velocity joint of claim 12, wherein the first mounting face has at least one protrusion that is disposed in a recess formed in the second mounting face.

14. The constant velocity joint of claim 1, wherein the outer surface of the spacer comprises a stop shoulder located on an end disposed away from the boot, and the shaft end of the boot abuts the stop shoulder.

15. The constant velocity joint of claim 1, further comprising a second shaft having a joint housing disposed on an end thereof, the joint housing having a central bore with a corresponding plurality of axially extending, circumferentially and radially spaced ball grooves disposed therein, and a corresponding plurality of spherical balls, the joint housing disposed over the pocket portion with the corresponding plurality of balls disposed in the plurality of pockets and the ball grooves, thereby forming a movable joint.

16. The constant velocity joint of claim 1, wherein the moveable joint is configured for angular and telescoping movement of the first shaft relative to the second shaft.

17. The constant velocity joint of claim 1, wherein the first shaft further comprises a second enlarged joint portion.

18. The constant velocity joint of claim 17, further comprising
a second hollow boot disposed on the first shaft having a second joint end and a second shaft end, the second joint end disposed proximate the second enlarged joint portion and the second shaft end disposed proximate the axle portion; and
a second spacer, the second spacer having an second inner surface disposed on the axle portion and second outer surface having the second shaft end of the second boot disposed thereon.

* * * * *